US009323646B2

(12) United States Patent
Boisde et al.

(10) Patent No.: US 9,323,646 B2
(45) Date of Patent: *Apr. 26, 2016

(54) HARDWARE SECURITY MODULE WITH MEANS TO SELECTIVELY ACTIVATE OR INHIBIT DEBUGGING AND CORRESPONDING DEBUGGING METHOD

(75) Inventors: Matthieu Boisde, Gradignan (FR); Nicolas Bousquet, Pessac (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 1049 days.

This patent is subject to a terminal disclaimer.

(21) Appl. No.: 13/328,229

(22) Filed: Dec. 16, 2011

(65) Prior Publication Data

US 2012/0159447 A1  Jun. 21, 2012

(30) Foreign Application Priority Data

Dec. 17, 2010  (FR) ..................... 10 60722

(51) Int. Cl.
*G06F 9/44* (2006.01)
*G06F 11/36* (2006.01)

(52) U.S. Cl.
CPC .................. *G06F 11/3648* (2013.01)

(58) Field of Classification Search
None
See application file for complete search history.

(56) References Cited

U.S. PATENT DOCUMENTS

| | | | | |
|---|---|---|---|---|
| 4,802,165 A * | 1/1989 | Ream | .................. | G06F 11/3636 714/35 |
| 5,664,159 A * | 9/1997 | Richter | ............... | G06F 11/3648 703/23 |
| 6,567,933 B1 * | 5/2003 | Swoboda | ............ | G06F 11/3656 710/59 |
| 6,684,348 B1 * | 1/2004 | Edwards | ............. | G06F 11/3636 714/45 |
| 7,206,982 B1 * | 4/2007 | Patel | .................. | G01R 31/2884 375/224 |
| 7,584,381 B2 * | 9/2009 | Kudo | .................... | G06F 11/273 714/27 |
| 8,644,880 B2 * | 2/2014 | Patrice | ................. | G06K 7/0008 455/41.1 |

(Continued)

FOREIGN PATENT DOCUMENTS

FR          2 793 327          11/2000

OTHER PUBLICATIONS

David B Everett—"Smart Card Tutorial—Part 1"—1992 Located at http://www.smartcard.co.uk/tutorials/sct-itsc.pdf.*

(Continued)

*Primary Examiner* — Qing Chen
*Assistant Examiner* — Hossain Morshed
(74) *Attorney, Agent, or Firm* — Young & Thompson

(57) ABSTRACT

The present invention relates to the field of debugging of compiled programs in a hardware security module such as a microprocessor card. A module according to the invention includes a microprocessor and a compiled program to be executed by the microprocessor in order to carry out an operation. The compiled program includes at least one debugging instruction which whether or not it is executed does not modify the execution of the operation. And, the hardware security module includes an element of inhibiting or activating the debugging instruction during the execution of the compiled program.

17 Claims, 6 Drawing Sheets

(56) References Cited

U.S. PATENT DOCUMENTS

| | | | | |
|---|---|---|---|---|
| 2002/0099953 A1* | 7/2002 | Deindl | G06F 11/362 | 726/26 |
| 2006/0195721 A1* | 8/2006 | Moyer | G06F 11/3648 | 714/30 |
| 2008/0072103 A1* | 3/2008 | Lou | G01R 31/31705 | 714/38.14 |
| 2008/0109675 A1* | 5/2008 | Deng | G06F 11/3636 | 714/2 |
| 2009/0037887 A1* | 2/2009 | Chavan | G06F 11/3636 | 717/128 |
| 2009/0082008 A1* | 3/2009 | Thorell | G06F 11/362 | 455/423 |
| 2012/0159253 A1* | 6/2012 | Boisde | G06F 11/3656 | 714/32 |
| 2012/0159447 A1* | 6/2012 | Boisde | G06F 11/3648 | 717/124 |
| 2012/0291016 A1* | 11/2012 | Baek | G06F 11/3668 | 717/124 |

OTHER PUBLICATIONS

"Cisco 1800 Series Software Configuration" located at http://www.cisco.com/c/en/us/td/docs/routers/access/1800/1841/software/configuration/guide/sw/b_creg.html 2004.*

Smart Card Tutorial—Part 1—First Published in Sep. 1992.*

French Search Report dated Sep. 28, 2011, corresponding to Foreign Priority Application No. 10 60722.

"Smart Card Tutorial—Introduction to Smart Cards"; Sep. 1, 1992; pp. 1-163.

* cited by examiner

```
1   void inspectedFunction(void) {
2      // local variables
3      int var_a, var_b, var_c;
4
5      // function begin
6      UDEBUGF("Processing method inspectedFunction\n");        ◄──── ID1
7
8      // local vars initialization
9      ...
10
11     if (function_a() == SUCCESS) {
12         UDEBUGF("Call to function_a() succeeded");    ◄──── ID2
13
14         // some processing
15         ...
16     }
17     else {
18         // function_a() failed
19         UDEBUGF("Call to function_a() failed");    ◄──── ID3
20
21         // some processing
22         ...
23
24         if (function_b(var_a, var_b, var_c) != SUCCESS) {
25             // Error Case
26
27             // report on error
28 UDEBUGF("Unexpected error during call to function_b()");◄──── ID4
29 UDEBUGF("Function Parameters : %i, %i, %i", var_a, var_b, var_c);
30                                                              ID5
31             // error processing
32             throw (Exception);
33             ...
34         }
35     }
36
37     // some processing
38     ...
39
40     // function end
41     UDEBUGF("Leaving method inspectedFunction\n");    ◄──── ID6
42  }
```

```
1   UDEBUGF function(parameters)
2   if(B_enable) {
3              [... Debugging processing ...]
4   }
5   else return
```

Figure 3

HARDWARE SECURITY MODULE WITH MEANS TO SELECTIVELY ACTIVATE OR INHIBIT DEBUGGING AND CORRESPONDING DEBUGGING METHOD

This patent application claims the priority of French Patent Application No. 1060722 of 17 Dec. 2010, which is incorporated herein by reference.

FIELD OF THE INVENTION

The present invention relates to the field of debugging of computer programs or applications, in particular in the case of closed environments such as hardware security modules (HSMs).

The invention relates more particularly to a debugging method and a hardware security module provided for such debugging. Such a hardware security module can be in the form of a microprocessor card or "chip card" (also known by the term "smart card", for example a card provided with a security module such as a SIM card), a secure USB key with a microprocessor, a security module of a biometric passport, etc.

CONTEXT OF THE INVENTION

A computer program groups together a set of instructions which when concatenated on execution allow the performance of an operation or a set of operations desired by the programmer.

In a manner known per se, the debugging of a computer program concerns the activity and procedures consisting of detecting, diagnosing and correcting bugs, i.e. the causes of program malfunctions.

The causes of malfunctions can result from programming errors, but also from incompatibilities or poor management between the program code and the hardware resources available during the execution of the program.

Conventionally, computer programs or software are written in a programming language (source code), debugged from the source code, then compiled, all within an "Integrated Development Environment" (IDE) grouping together the set of software development tools. Development environments are, for reasons of cost, usually executed on personal computers (PCs).

Thus, a programmer can test a developed program by executing it step by step from its source code (called "line-by-line" debugging), i.e. instruction after instruction, or by inserting additional instructions therein, called debugging instructions, the execution of which does not change the performance of the program operation or operations.

The debugging instructions can for example print, log or simply display the current values of internal variables of the program, such as the values stored in the "runtime stack".

When the debugging procedure is terminated, the debugging instructions are deleted from the source code and the latter is compiled in order to obtain an executable compiled program, i.e. a production version of the program. It is then loaded into the memory of the hardware platform in which it is intended to be executed, this platform providing it with a runtime environment, illustrated for example by the operating system that it comprises.

The compiled program can for example be loaded into the ROM or EEPROM ("Electrically-Erasable Programmable Read-Only Memory") memory of a hardware security module.

Hardware security modules however have particular hardware and/or software characteristics (for example in relation to the operating system) compared with the personal computers in which the development environments are implemented, in particular in that they have limited system resources and are designed to reveal a minimum of information on their internal operation.

It is thus standard procedure to use hardware security module emulators, within a development environment on a PC, and to execute these emulators to reproduce, as faithfully as possible, a runtime environment of the hardware security module.

It may be the case, however, that a compiled program is not satisfactory and requires debugging again, for example because not all situations had been tested during previous debugs. In this case, it is usual to retrieve the corresponding source code and re-test it in the development environment.

This approach proves satisfactory when the development environment is substantially similar to the runtime environment of the program, once the latter has been compiled. In this case, malfunctions observed using the compiled program can be reproduced in the development environment and can then be corrected.

However, this is not always the case for hardware security modules, owing to the discrepancies mentioned previously and also because these modules can be personalized by a client (for example a bank) or have hardware components producing unexpected faults linked to their individual characteristics. In this case it is difficult to envisage adjusting the emulators, or even impossible when the individual characteristics specific to each HSM are taken into account.

These discrepancies are moreover difficult to determine and observe, owing to the closed nature of the hardware security modules resulting for example from security protection measures that they use in order to reveal a minimum of their internal operation.

Thus, the hardware security module emulators used for the program development are generally based on an imperfect modelling of the runtime environment of the HSM.

As a result, some malfunctions observed during the execution of the compiled program in a hardware security module cannot be reproduced by the corresponding source code when the latter is executed in the development environment, despite the use of emulators.

This difficulty existing in the case of hardware security modules consequently gives rise to additional, sometimes uncontrolled, costs for debugging a computer program and providing a "clean" compiled version.

In this context, the present invention aims to provide an improvement to the systems and methods of the state of the art for debugging purposes.

SUMMARY OF THE INVENTION

In this context, the invention relates in particular to a hardware security module comprising a microprocessor and a compiled program to be executed by said microprocessor in order to carry out an operation, characterized in that:
  the compiled program comprises at least one debugging instruction which whether or not it is executed does not modify the execution of said operation, and
  the hardware security module comprises a means of inhibiting or activating the debugging instruction during the execution of the compiled program.

The invention makes it possible to improve the debugging of the programs without adversely affecting their performance when in operation.

The presence of the debugging instructions within the compiled program itself makes it possible to carry out the debugging of this program under its exact production conditions and not under approximate conditions created by an emulator.

Moreover, putting in place a means of inhibiting or activating the debugging instructions makes it possible to retain the same compiled program comprising the debugging instructions when it proceeds to the production phase. It is then possible to inhibit these debugging instructions, which means that they are not executed when the compiled program is executed, so that the execution of the compiled program in the production phase is not substantially extended.

On the other hand, when tests are necessary, the debugging instructions are activated.

As will become apparent below, the execution of the debugging instructions makes it possible to generate items of debugging information (for example with the values of internal variables) which will be used and operated by a debugging application, for example by means of a simple display to a user.

In an embodiment, the hardware security module is configured to change the inhibition or activation state of said inhibition or activation means in response to a command received from an external entity.

Hereinafter, the concept of "external" relates to whether or not an element belongs to the hardware security module (HSM) in question.

This arrangement allows the "test/debugging" or "operation" mode in which it is desired to use the compiled program to be controlled from outside the security module (for example a chip card). Thus, when the security module is personalized, (for example by a supplier, then by a bank, etc.), it is easy to return to a debugging configuration in order to identify the causes of malfunctions resulting from optional personalization.

According to a particular feature, said inhibition or activation means comprises a state bit stored in the memory of the hardware security module. This arrangement proves particularly simple to implement, on the one hand because it requires few resources in the security module (which generally has limited resources), and on the other hand because a simple write command from the external entity can be sufficient to change the state of the inhibition or activation means.

In particular, the debugging instruction comprises a conditional instruction as a function of said state bit. Again, this arrangement has a low level of complexity for achieving the inhibition or activation according to the invention.

In particular, said memory is a one-time programmable memory so that an inhibition of the debugging instruction is definitive.

Thus, generally the stored information or state bit initially adopts a value corresponding to an activation state (therefore initially allowing debugging to be carried out) then, owing to the nature of the memory, definitively adopts an inhibition value as soon as the debugging tests are finished.

This arrangement offers a higher security level insofar as, immediately on inhibition, the hardware security module definitively returns to its first configuration, namely showing a minimum of its internal operation.

Furthermore it will be noted that this information can be used in the conditional instructions mentioned previously to authorize execution of a debugging instruction or not.

According to a particular feature, the inhibition or activation means is protected from modification by a cryptographic security mechanism. In the context where on the one hand the hardware security module is designed to reveal a minimum of its internal operation and on the other hand the debugging instructions aim to reveal a portion of the latter, this arrangement makes it possible to ensure a reasonable level of security to avoid revealing information on this internal operation without authorization.

In an embodiment, the at least one debugging instruction is configured to copy items of debugging information into a file stored locally in the hardware security module, and the latter is configured to transmit said file at the request of an external entity.

This configuration corresponds to a mode of operation, hereinafter called "deferred" mode, that is particularly suitable for modules having a single ISO 7816 or ISO 14443 type connection with a reader.

In the case for example of exchanged APDU messages (ISO 7816), the items of debugging information cannot be transmitted while they are being generated, as only a response to an APDU command can be provided and it would be complex to provide, in test scripts, commands synchronized with the debugging instructions in order to receive their results. Moreover, it is preferable to avoid intervening in the standard APDU exchanges for executing the compiled program, in order to retain a runtime configuration that is as close as possible to a production configuration.

The local file thus acts as a temporary memory for items of configuration information while waiting for the ISO 7816 link to be "free", at which point the file can be communicated.

In particular, said locally stored file is of the fixed-length circular list type. This configuration allows better control of the use of the limited memory resources of the HSM.

According to a variant, the hardware security module is configured to transmit, during the execution of the compiled program, data, called debugging data, resulting from the execution of the debugging instruction over a communication channel initiated by the hardware security module to an external entity.

In this case, the channel initiated by the module can be in parallel to the APDU or equivalent exchanges allowing the "standard" execution of the compiled program. This then is a so-called "real-time" mode of operation, since a debugging application (on the external entity) can retrieve the items of debugging information while they are being generated.

By way of example, the debugging instruction can then be configured to write the debugging data over a UDP socket created by the hardware security module.

In this particular configuration, a subject of the invention is also a mobile phone comprising a contactless communication interface and such a hardware security module, the hardware security module comprising a first electrical contact linked to said contactless communication interface, wherein a communication channel dedicated to driving the execution of the compiled program by an external master entity and the channel initiated by the hardware security module for communication with said external entity are, for one of them, compliant with a contactless communication standard via the first electrical contact and, for the other one, compliant with a contact communication standard via a second electrical contact of the hardware security module.

According to a particular embodiment of the invention, the inhibition or activation means can comprise, apart from an inhibition state, two activation states corresponding respectively to a configuration of the debugging instruction in order to store locally items of debugging information resulting from the execution of this debugging instruction and to a configuration of the debugging instruction for directly transmitting these items of debugging information over a communication channel initiated by the hardware security module.

It is thus possible to switch between a "real-time" debugging when the connections between the HSM and the external entity allow it and a "two-step" debugging, for example by default. This decision can equally well be made by the external entity (having a test script available) by sending a command to change the inhibition/activation state to the desired state, or by the HSM itself, according to whether one or the other has detected for example the sufficiency or insufficiency of the connections between them.

According to a feature of the invention, the hardware security module can be configured to encrypt the debugging data transmitted over the communication channel that it initiates, making it possible to secure the debugging operations vis-à-vis the internal operation of the security module which must remain undisclosed as far as possible.

Correlatively, the invention also relates to a debugging method in a hardware security module comprising a microprocessor and a compiled program to be executed by said microprocessor to carry out an operation, characterized in that the compiled program including at least one debugging instruction which whether or not it is executed does not modify the execution of said operation, the method comprises at least one step of switching between an activation state in which the debugging instruction is executed when the compiled program is executed, and an inhibition state in which the debugging instruction is not executed when the compiled program is executed.

The debugging method has advantages similar to those of the HSM disclosed above. In particular, it makes it possible to improve the debugging of the programs without adversely affecting their performance when in operation.

Optionally, the methods can comprise steps and features with respect to the means and features of the HSM.

And in particular, a step can be provided for the hardware security module to receive a command changing the inhibition or activation state, transmitted by an external entity.

According to another feature, the method can comprise a step of switching definitively to the inhibition state, for example by writing an item of inhibition information to a one-time programmable memory.

According to yet a further feature, the method can comprise a prior authentication step for authorizing the switching from one state to the other.

BRIEF DESCRIPTION OF THE FIGURES

Other features and advantages of the invention will become apparent from the following description, illustrated by the attached drawings, in which:

FIG. 3 shows a simplified example of a compiled program (in its source version) including debugging instructions according to an embodiment of the invention;

DETAILED DESCRIPTION OF EMBODIMENTS OF THE INVENTION

Figure 1:
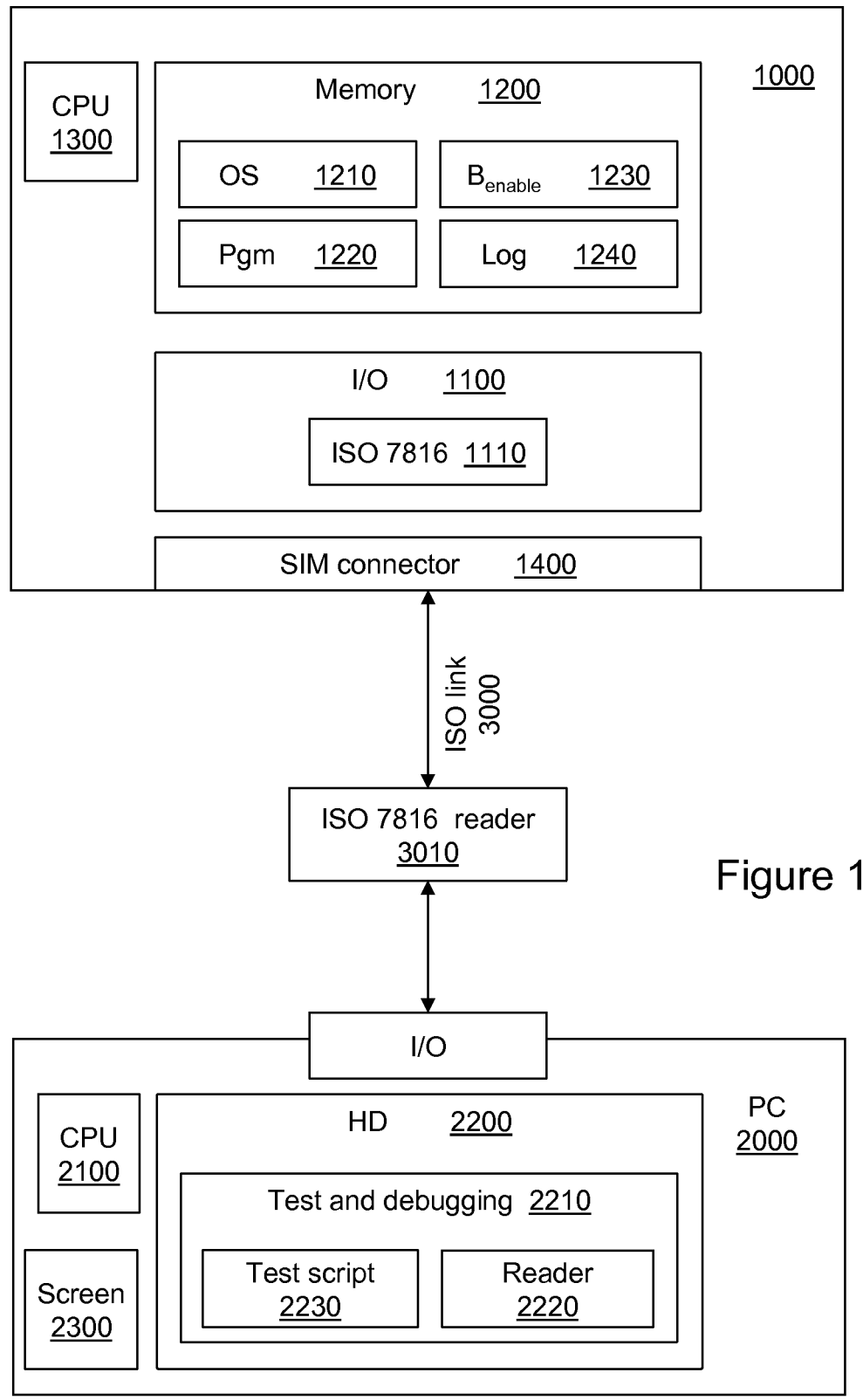
FIG. 1 shows a system for debugging in "deferred" mode according to the invention, using a standard ISO 7816 connection.

The present invention can be applied to any type of hardware security module. For the purposes of illustration only, reference is made hereinafter to a microprocessor card (or "chip card"). A hardware module is called a "security" hardware module for example if it conforms to a standard relating to security, for example if it conforms to the common criteria and/or the standard "FIPS 140" ("Federal Information Processing Standard").

Microprocessor cards include compiled programs that they can execute at the command of an external entity. Microprocessor cards form part of a master-slave relationship (similar to a client/server mode), in which an external reader sends commands that the card executes. This execution drives that of the compiled programs it contains, and provides responses to the reader once the execution is terminated.

As described hereinafter, embodiment examples of the invention implement in a microprocessor card such a compiled program in which debugging instructions have been kept, in addition to the instructions intended to perform the primary operation or function of said program.

The debugging instructions are executed during a test phase. Thus a master program or test script is generally designed to drive the execution of the compiled program, by sending commands to the microprocessor card. The test script is simply a program, potentially a production program, in which certain parameters are set and known so as to define tests.

The debugging instructions are then executed during the execution of the compiled program, and provide to debugging software (which can be different from software containing the test script) appropriate debugging information relating to this execution of the compiled program in a production runtime environment, in this case in the operating system of the microprocessor card.

It is thus possible to compare the results obtained from the debugging instructions with expected results.

The test script is for example in an external appliance provided with a microprocessor card reader and can exchange information in a master-slave mode with the microprocessor card, using conventional protocols, for example according to standard ISO 7816 using APDU commands and responses.

In a normal use configuration of the compiled program ("production conditions"), these exchanges between the test script and the card do not relate to the debugging instructions as the test scripts represent the normal runtime conditions of the compiled program and therefore access the compiled program in the microprocessor card only in order to perform therein the primary operation of the compiled program, although optionally with some predefined test parameters.

As the debugging instructions increase the size of the compiled program, care will be taken to restrict their number and to place them in a considered manner according to the algorithmic sequences of the program, so as to comply with the limited resources of the microprocessor cards (for example the ROM capacity).

Apart from the increase in the size of the compiled code, these debugging instructions introduce an increase in the runtime of the compiled program.

According to the invention, provision is then made to use a means of inhibiting or activating these debugging instructions on demand. Thus, under some operating conditions, the debugging instructions could be deactivated so that they are not executed during the execution of the compiled program containing them. This makes it possible to reduce the runtime of the compiled program during its production use.

Furthermore, as the test scripts represent normal runtime conditions of the program, the (ADPU type) exchanges with the microprocessor card are not designed to supply to the card reader (where the test user has access) the results of the execution of the debugging instructions.

Moreover, if it were necessary to retrieve them using APDU commands, numerous and complex adaptations would be required to ensure that an APDU command was generated at each debugging instruction in order to retrieve the result from it. These adaptations cannot be envisaged.

It will then be possible to envisage another communication channel (different from the master-slave relationship of the APDU commands) created and used on the microprocessor card's initiative (no longer by a card reader), in order to communicate the results of the execution of the debugging instructions.

These two communication channels are of a different type (therefore logically different), but can also in addition be physically different, for example via two different physical connections between the card and the card reader. In this way it is ensured that the configuration in which the compiled program is executed conforms as closely as possible to the production configuration.

The invention will now be illustrated with reference to various embodiments of debugging systems.

FIG. 1 shows a debugging system using a conventional ISO 7816 connection, over which APDU message exchanges are implemented.

This connection has the drawback that it only allows one communication at a time, i.e. a single communication channel at any given time. For this reason, the embodiment corresponding to this figure is hereinafter called the "deferred mode", in that the results of the debugging instructions (the channel initiated by the card) cannot be transmitted at the same time as the test script exchange (the master-slave channel) with the card for executing the compiled program. These results will therefore be transmitted over the ISO 7816 link successively, when the use of the first communication channel has ended (i.e. generally after the test script has been executed).

For this reason, this embodiment does not, strictly speaking, provide the debugging information in real time.

Figure 4:
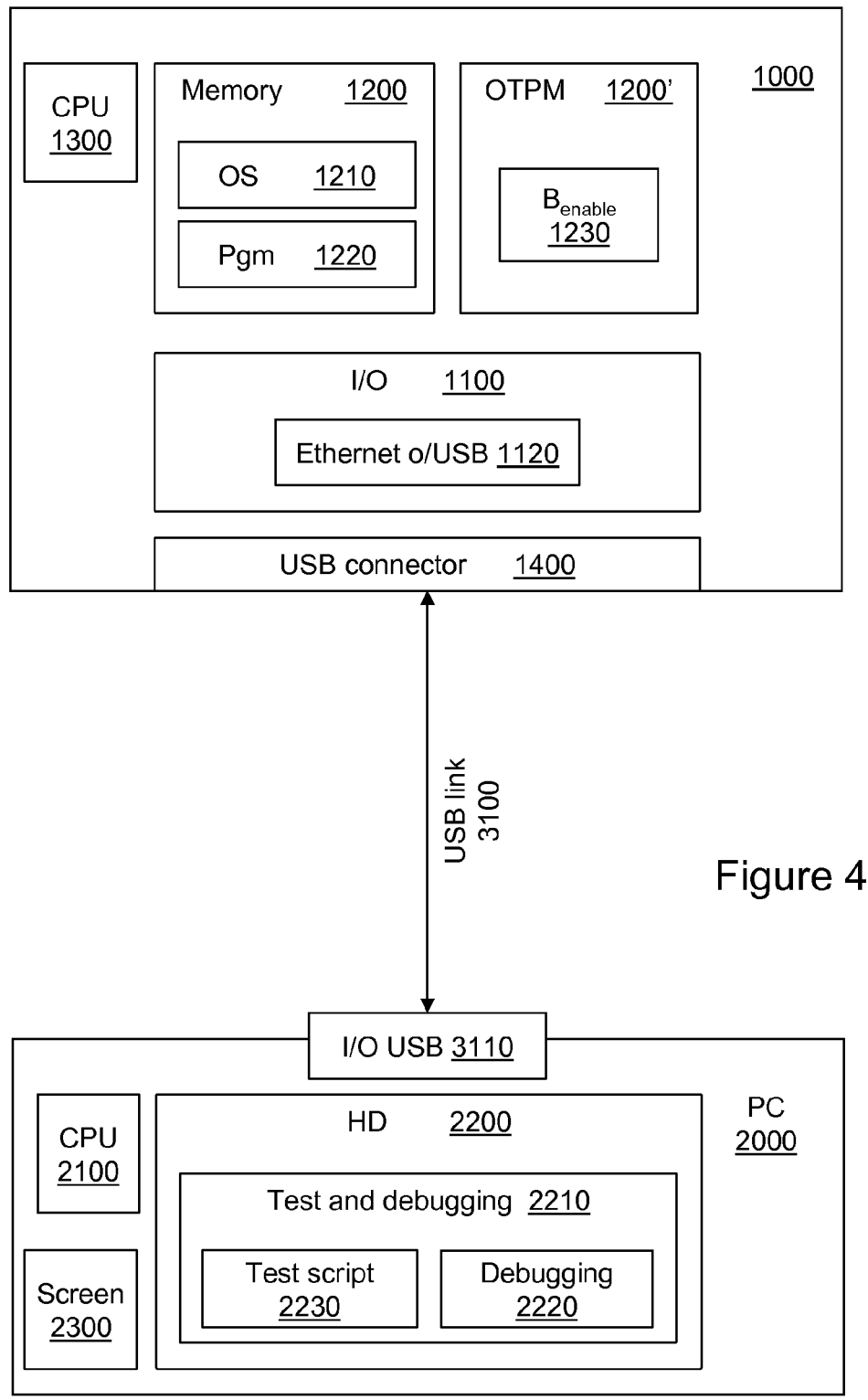
FIG. 4 shows a debugging system in "real-time" mode according to the invention, using a USB connection.

FIG. 4 shows an equivalent debugging system that in contrast uses a connection authorizing several simultaneous communications, for example a USB connection.

It is now established that some microcontroller cards have a USB interface allowing several parallel communications between the card reader and this card.

The embodiment of the invention corresponding to this figure is hereinafter called the "real-time mode" in that the results of the debugging instructions can be directly transmitted to the external entity as soon as these instructions are executed. The exchanges with the test script (the master-slave channel) and transmission of the results of the debugging instructions (the channel initiated by the card) can then be simultaneous over a single USB physical link between the microprocessor card and the card reader.

Of course, other configurations can be envisaged. For example, if the microprocessor card has two communication interfaces (therefore two physical links, for example one by contact via ISO 7816 or USB with the external entity holding the test script, and the other contactless, for example ISO 14443, with the external entity, identical or different, holding debugging software; also for example one via certain electrical contacts of an ISO 7816 physical interface and the other via alternative contacts of this same physical interface), the two communication channels can be simultaneous over the two corresponding different physical links.

Figure 6:
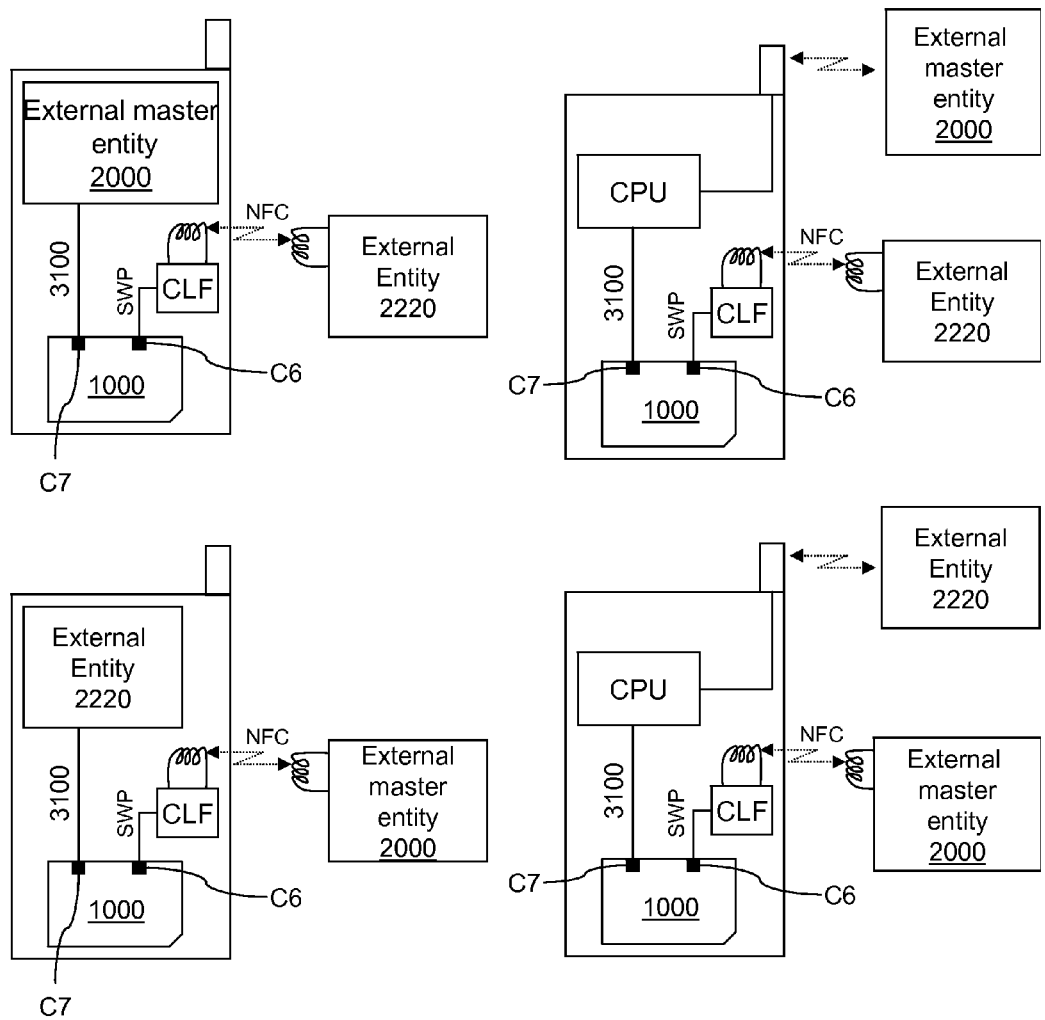
FIG. 6 shows an implementation configuration of the invention for a hardware security module integrated into a mobile phone provided with a contactless communication interface of the NFC type.

Also, as shown in FIG. 6, the microprocessor card, for example a contact SIM card or any integrated circuit, can form part of a host appliance such as a mobile phone or smartphone. This host appliance is provided with an NFC-type contactless CLF ("ContactLess Frontend") circuit, connected to the C6 electrical contact of the SIM card. The latter communicates with the CLF circuit using the SWP protocol ("Single Wire Protocol"), allowing contactless communication with an external entity via the CLF circuit (or, in a variant, with the computer 2000 described below).

In this configuration, one of the communication channels (master-slave channel or channel initiated by the card) is implemented over this contactless communication interface (C6-SWP-CLF-NFC contact) and the other communication channel can be implemented using the conventional ISO 7816 protocol at the C7 (I/O) contact. Preferably, the contactless NFC communication is initiated by the SIM card.

The different configurations shown in this figure differ according to the use of one or other of these channels for communicating either with the external entity or with the master computer 2000, and also according to the implementation of the external entity or master computer 2000 (as applicable) within the mobile phone itself or by an external appliance with which the mobile phone communicates via conventional mobile communications means.

With reference to FIG. 1 describing the "deferred mode" a card 1000 having a microprocessor 1300 also comprises a memory 1200, for example EEPROM, an I/O communication module 1100 and a physical connection interface 1400 allowing the module 1100 to communicate externally. The card 1000 can be a hardware security module allowing confidential data to be protected, for example using authentication and/or encryption procedures.

The communication module 1100 is shown here by an ISO 7816 communication module (reference 1110) allowing communication with an external reader via APDU messages. Of course, other communication protocols (with or without contact, USB, etc.) can be envisaged in the "deferred mode" described here. The connection interface 1400 can be contact or contactless according to the hypothetical case envisaged.

The memory 1200 here comprises an operating system OS 1210, the execution of which by the microprocessor 1300 defines a runtime context for other applications or programs. It also comprises the compiled program 1220 including debugging instructions ID, subject of the debugging according to the invention, as well as a means 1230 of activation or inhibition of the debugging instructions and a debugging file 1240.

It should be noted that the compiled program 1220 to be tested and debugged comprises a set of instructions I which carry out one or more operations OP and define the primary function of the production program, and comprises one or more debugging instructions ID introduced within the instructions I. The debugging instructions ID have no impact on the implementation of the program function, i.e. whether or not they are executed during the execution of the compiled program has no effect on the execution of the instructions I and thus on the result of the program expected by the application calling it.

In a particular example, the compiled program can be directly the operating system OS 1210, in which case the following explanations will be adapted to the compiled program OS 1210. The runtime environment is then constituted by the hardware components of the card and their drivers.

The means 1230 can simply take the form of a device having two states '0' or '1', for example via a $B_{enable}$ bit (or flag) in the memory: $B_{enable}=1$ corresponds to activated debugging instructions as described below (called the "active" state), and $B_{enable}=0$ to deactivated instructions (called the "inhibition" state). The means 1230 can however adopt more complex forms, such as for example a stateful machine.

A central bus (not shown) links the different electronic components of the previously-described card 1000, as well as a RAM memory (not shown) into which are loaded the instructions of the compiled program 1220 and those of the OS 1210 so that they can be executed by the microprocessor 1300 when the card 1000 receives an electricity supply.

A card reader 3010, here of the type ISO to allow the exchange of information with the communication module 1110 according to the ISO 7816 standard, is provided for receiving the card 1000. In the figure, the connecting physical link between the card 1000 and the card reader 3010 is shown by the reference 3000. It should be noted that in some embodiments, this physical link can correspond to a contactless ISO 14443 communication.

This card reader 3010 forms part of or is connected to a test and debugging appliance, here simply a personal computer PC 2000.

This computer 2000 is of a conventional type and comprises, for the purposes of illustrating the invention, a CPU processor 2100, a display screen 2300 and a memory 2200, of the hard disk (HD) type, containing a test and debugging application 2210, containing in particular a test script 2230 and a program 2220 for reading the debugging file also called "debugging software".

The test script 2230 can consist of an ISO 7816 command sequence (APDU commands) intended to automatically execute and drive the compiled program 1220, and also other functions of the card 1000 (for example operating system (OS) commands).

The reader program 2220 is itself configured to read a debugging file such as the file 1240 and to display the debugging information to a test user via the screen 2300. The reader program 2220 can be launched automatically at the end of execution of the test script 2230, to transfer the debugging file 1240 so that it can be read and displayed.

In a variant, an action by the test user can be required.

Moreover, the test script 2230 and the reader program 2220 can be two independent applications, i.e. not belonging to a single test and debugging application 2210.

Figure 2:
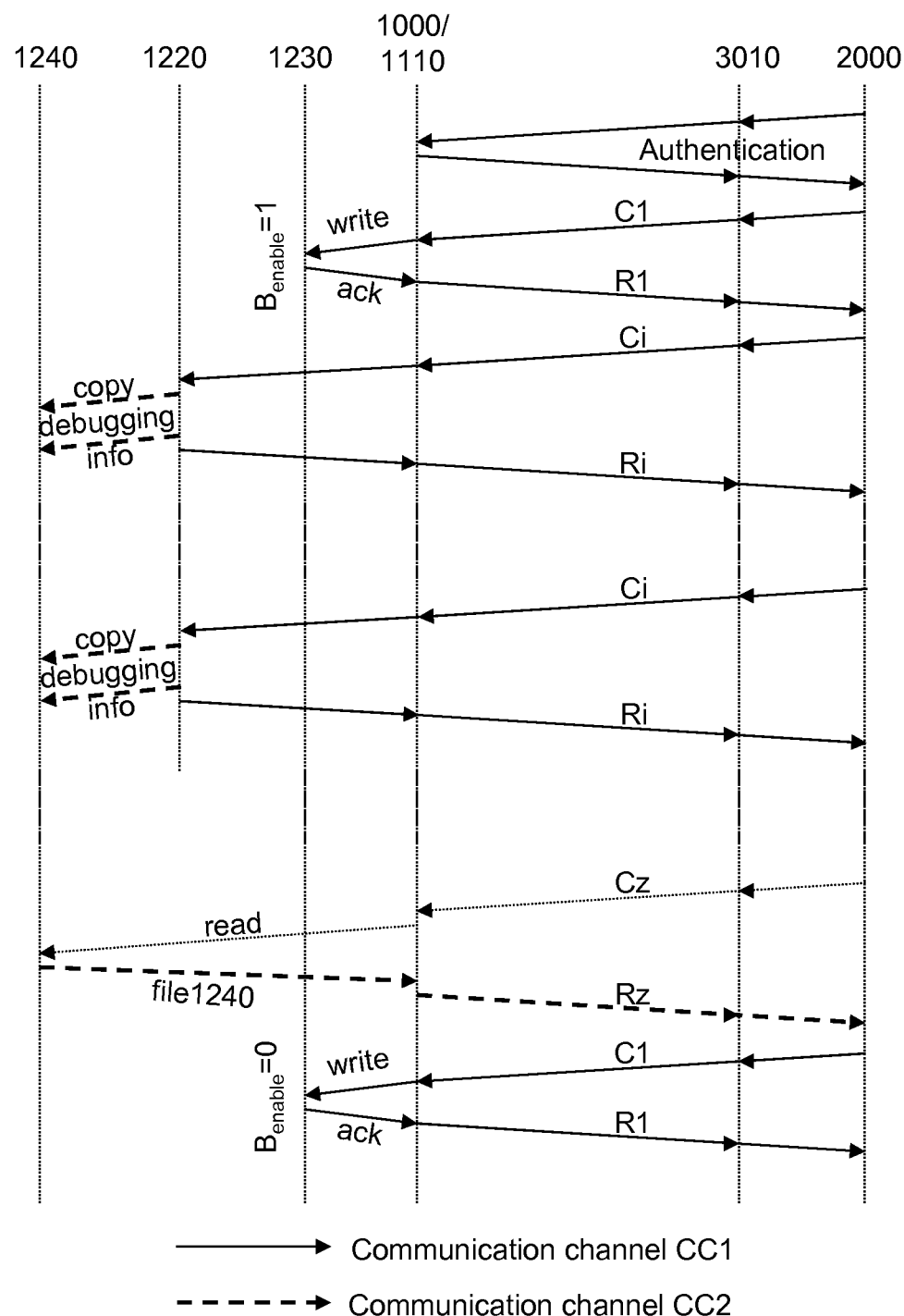
FIG. 2 shows data exchanges between the microprocessor card and a test appliance, in the deferred mode of FIG. 1.

The debugging process at the request of the test user will now be described with reference to FIG. 2. In this figure, the tips of the arrows denote the elements involved either in the relaying or in the processing of a transmitted message.

The user launches the application 2210. As it is a test and debugging application, the programs to be tested in the card 1000 must execute the debugging instructions ID that they contain.

To this end, the application 2210 initiates the execution of a test script 2230 which sends a first ADPU command C1, via the ISO reader 3010, to the card 1000 to activate the debugging instructions ID. This command is transmitted in a first communication channel initiated by the PC 2000 associated with a reader 3010.

In a variant this command C1 can be sent by the test application 2210 before launching the test script 2230.

The effect of the command C1 is to make the two-state device 1230 change to the active state: $B_{enable}=1$. For the purposes of illustration, this command C1 can be a simple write request of the $B_{enable}$ bit with the value 1.

It should be noted that for security reasons, such a command can require prior authentication of the test user (i.e. of the computer 2000) in the card 1000, by conventional mechanisms. Thus, the card 1000 will only be authorized to execute the command C1 if the authentication has been successful.

After acknowledgment R1 of this command, the card 1000 is ready for the debugging of the compiled program 1220.

The rest of the test script 2230 is run and has the effect of sending a predefined sequence of APDU commands Ci, activating and driving the execution of the compiled program 1220 according to any predefined test parameters.

These commands Ci reproduce a possible behaviour of an operation of the compiled program 1220 used in its production configuration. In other words, these commands only process the primary function or operation OP implemented by the compiled program 1220, and not the debugging instructions ID.

When received by the card 1000, these commands Ci are processed by executing the compiled program 1220 and generate APDU responses Ri.

The commands C1, Ci and responses R1, Ri are exchanged between the compiled program 1220 and the test application 2210, within the (master-slave) communication channel CC1 between these two software components and initiated by the PC 2000 or reader 3010. This first channel CC1 takes in particular the link 3000.

During the execution of the compiled program 1220, the debugging instructions ID are executed as a result of the active state $B_{enable}=1$ of the means 1230.

The debugging instructions ID comprise processing that does not modify the execution of the instructions I, for example this can involve retrieving a copy of values of internal variables and/or of the current runtime stack storing current instructions and values.

These items of retrieved information, or "items of debugging information", are copied to the debugging file 1240. The debugging file 1240 can in particular be implemented in the form of a circular list, optionally concatenated and/or having inputs of limited length, to limit the size of the items of debugging information in the memory of the card 1000. This configuration is particularly advantageous for microprocessor cards provided with limited memory resources. Of course other embodiments, such as a linear file or a table, can be envisaged.

The copy function in particular is provided within the debugging instructions ID themselves.

Once the execution of the test script 2230 is complete, the reader program 2220 can be launched, while the ISO communication link 3000 is free from that moment, released from the APDU communications Ci/Ri.

The reader program 2220 then sends a new APDU command Cz, automatically or on instruction from the test user, for the purpose of obtaining a copy of the debugging file 1240. For the purposes of illustration, this command Cz can be a simple request to read this file 1240.

The file 1240 is obtained by the operating system OS of the card 1000 reading the memory 1200. The debugging file 1240 is consequently sent (response Rz) to the reader program 2220, via the ISO link 3000.

As is apparent from the above, this embodiment uses a deferred communication of the items of debugging information by temporarily storing them in the debugging file 1240.

In this example, the communications are implemented successively over a single physical link 3000 linking the card 1000 with the card reader 3010 and the computer 2000.

It should be noted that in a security embodiment, the debugging file 1240 and therefore the items of debugging information that it contains can be encrypted before leaving the card 1000 for transmission over the link 3000.

The items of debugging information thus retrieved by the reader program 2220 are used locally in order to deduce therefrom any malfunctions and bugs of the compiled program for the purpose of correcting them. By way of example, this use can consist of displaying the items of debugging information (the value of the internal variables or of the runtime stack) to the user via the display unit 2300.

Execution of the test script 2230, the reader program 2220 or the test application 2210 can be terminated by sending a new command (similar to the command C1) to switch the two-state device 1230 to the inhibition state $B_{enable}=0$. Thus, if the compiled program 1220 is called again for a use other than a test and debugging, its execution will not be extended owing to the debugging instructions ID.

FIG. 3 shows a simplified example of a compiled program (in its source version) including debugging instructions ID.

This example concerns a function called "inspectedFunction" comprising instructions I for carrying out a primary function of the program (not made explicit in lines 14 and 21 for example) and debugging instructions ID1 to ID6.

In this example, the debugging instructions are intended to warn of the success or failure of the function called function_a( ) and if applicable to pop the value of the local variables var_a, var_b and var_c (ID5 in line 29). The instructions ID1, ID2, ID3, ID4 and ID6 provide, within the items of debugging information, an indication of the progress of the processing of the inspectedFunction.

It will be noted in this example that the inhibition or activation of the debugging instructions ID is implemented using conditional instructions on the basis of the $B_{enable}$ bit. Line 2 of the UDEBUGF function called by the instructions ID1-ID6 makes the debugging processing conditional on the presence of $B_{enable}=1$. Thus, in the absence of activation of the debugging instructions, the instruction UDEBUGF simply returns to the routine which called it, in this case to the inspectedFunction, at the current point.

It should be noted that the character strings passed within the parameters of this function are copied within the UDEBUGF function (line 3), into the file 1240.

Of course, other embodiments than the conditional instruction can be envisaged.

Referring now to FIG. 4 describing a "real-time mode" according to the invention, the card 1000 is similar to the card of FIG. 1, with the exception that it has a USB connection 3100 with a USB input/output interface 3110 on the computer 2000.

To this end, the card 1000 comprises an Ethernet-over-USB type communication module 1120 (instead of the ISO 7816 module referenced 1110 in FIG. 1) making it possible in particular to include a web server in the card 1000.

It should be noted that such web servers are currently created using the Java standard, for example Javacard 3.0.

Such a communication module is thus configured to create TCP or UDP sockets with a remote entity provided with an Ethernet or IP address.

Moreover, the two-state means 1230 is implemented in an OTPM ("One-Time Programmable Memory") 1200'. As a result, the means 1230 are in the active state ($B_{enable}=1$) by default. Of course this embodiment of the means 1230 described in connection with FIG. 4 can be implemented in the indirect mode of FIG. 1. Conversely, the embodiment of the means 1230 previously described in the indirect mode can be implemented in the present direct mode.

By the very nature of the OTPM memory, a command inhibiting the debugging instructions ID (a command C1 writing $B_{enable}=0$) definitively deactivates these instructions as the $B_{enable}$ bit can no longer return to the state 1. This configuration has a certain advantage in that it ensures that the secret items of information in the card can no longer be accessible to a malicious person, via the debugging mechanisms.

Thus this embodiment is mainly envisaged when tests must be carried out immediately after compilation of the program 1220, and when it is intended to make this program available for production as soon as the tests are complete. Definitive inhibition of the debugging instructions ID on demand thus takes place at the end of the tests using a simple command C1 (optionally secured by authentication).

Of course, other embodiments are possible such as for example decompiling the means 1230 into the combination of a first $B1_{enable}$ bit in the rewritable ROM memory to activate or deactivate the debugging instructions ID during a test phase, and a second $B2_{enable}$ bit in the OTPM memory to envisage the definitive deactivation of the instructions ID if necessary.

Use of the OTPM memory alone thus requires the test and debugging application 2210 not to systematically send the commands C1 previously described in connection with FIG. 1. Only one such command will be sent (once only) when the tests are definitively terminated.

Figure 5:
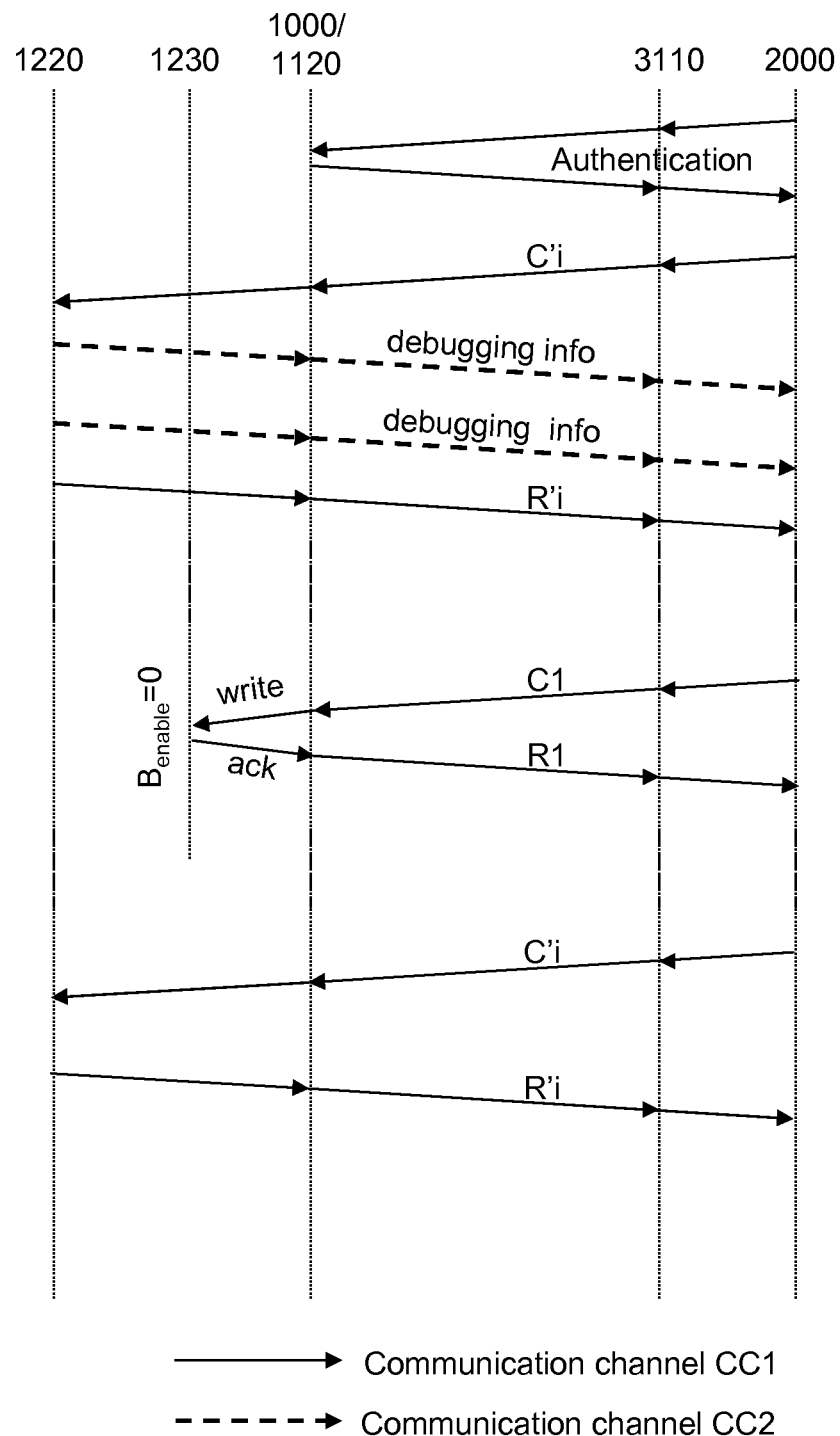
FIG. 5 shows data exchanges between the microprocessor card and a test appliance, in the real-time mode of FIG. 4.

FIG. 5 shows the data exchanges in the "real-time" mode according to the invention. In this figure, the tips of the arrows denote the elements involved in either the relaying or the processing of a transmitted message.

After optional conventional authentication to authorize or not authorize the card 1000 to execute any command sent by the computer 2000, the test script 2230 sends a sequence of commands C'i via the USB connection 3100, over the master-slave channel CC1. Here, these commands can be included in http requests to the web server provided in the card 1000.

These commands C'i (only one is shown in the figure) launch and drive the execution of the compiled program 1220.

Like $B_{enable}=1$, the debugging instructions ID are executed during the execution of the compiled program.

These executions of the instructions ID make it possible to retrieve items of debugging information, to create, according to conventional mechanisms, a UDP socket via the USB connection 3100 with the debugging software 2220, and to send these items of debugging information (in one or more than one go) to the debugging software 2220 via this socket. It should be noted that this socket can be created on powering up the card before the compiled program has been executed.

This sending is shown in the figure by the bold broken line corresponding to the channel CC2 initiated by the card and not the reader.

It should be noted that the Ethernet address of the debugging software (given in the transmitted UDP packets) is in the memory of the card 1000, for example stored after transmission by the test application 2210 at the start of its execution.

It is then possible for the items of debugging information to be used by the debugging software 2220 as described above for the deferred mode. Moreover, given the Ethernet formatting of the items of debugging information for their transport via the UDP socket, it is easy to relay these data to a third-party appliance remote from the computer 2000 via a communications network, for example the internet.

At the end of the execution of each command Ci by the card, a response R'i is sent to the test application 2210.

The term "real-time mode" is used because the items of debugging information are sent immediately on execution of the instructions ID, even if the execution of the compiled program 1220 has not been terminated. The two channels CC1 and CC2 can therefore be simultaneous over a single USB connection.

Subsequently, when the tests and debugging have been terminated, a command C1 can be transmitted to the card to deactivate the debugging instructions ID (optionally definitively). This makes it possible on the one hand to obtain the compiled program 1220 in its production version without its execution being extended by that of the instructions ID, and on the other hand to prevent any prohibited access to secret data which would have been sent via the items of debugging information, since such information is no longer produced.

This command C1 leads to writing $B_{enable}=0$ to the OTPM memory 1200' and to its acknowledgement R1.

As shown in the figure, from now on, if new commands C'i are transmitted, only the responses R'i will be sent to the computer 2000, and not items of debugging information.

This real-time mode can also be implemented in the hardware configuration shown in FIG. 6, since in this case the two communication channels are physically different.

The example of FIG. 3 is also applicable to the direct or real-time mode. In this case, the UDEBUGF function comprises, instead of instructions for copying the items of debugging information to the file 1240, instructions for writing the items of debugging information at the UDP socket and thus transmitting them to the reader program 2220.

The above examples are merely embodiments of the invention, which is not limited thereto.

In particular, the microprocessor card 1000 can have a first physical connection 3000, for example ISO 7816, with a first reader 3010 and a second physical connection 3100, for example USB, with a USB interface 3110 (both capable of being connected to a single computer 2000 containing the test application 2210). The two channels CC1 and CC2 can then each be implemented on respectively one of the two different physical connections.

Moreover, according to the nature of the physical connections, it is possible to implement at will the real-time mode or the deferred mode that are described above. This is the case with USB connections for example. This is also the case for a microprocessor card having two different physical connections.

In this case, the means 1230 of activation or inhibition can have more than two states: a first state $B_{enable}=0$ corresponding to the deactivation of the instructions ID as described previously, a second state $B_{enable}=1$ corresponding to the activation of the instructions ID in an indirect mode (use of the debugging file 1240), and a third state $B_{enable}=2$ corresponding to the activation of the instructions ID in a real-time mode (UDP socket), for example.

The choice between the second state and the third state (the two active states $B_{enable}\neq 0$) can be driven by the user or determined automatically according to the available connections and their use condition, with for example a preference for the real-time mode when both modes are available.

Moreover, several inhibition or activation means can coexist within the same hardware security module, it being possible to associate a means with a given compiled program, or with a type of debugging instruction within one or more compiled programs containing several of these types of instruction. A person skilled in the art will have no difficulty in adjusting the above-described teachings in the event of several inhibition or activation means being present.

It should be noted finally that the UDP protocol can equally well be implemented over connections with the USB, Bluetooth, ISO 7816 (part 1, defining the physical characteristics) and ISO 14443 (also part 1) physical layer protocols.

The invention claimed is:

1. A hardware security module, comprising:
   a microprocessor, and a compiled program stored in a memory device and executable by said microprocessor in order to carry out an operation,
   the compiled program comprising at least one debugging instruction which does not change a result or functionality of said operation regardless of whether said at least one debugging instruction is executed, and
   the hardware security module being configured to read a state flag from a memory having the state flag stored therein to inhibit or activate the debugging instruction during the execution of the compiled program,
   wherein the state flag inhibiting or activating the debugging instruction can take three values as follows:
   a first value corresponding to an inhibition state inhibiting the debugging instruction,
   a second value corresponding to a first activation state in which the at least one debugging instruction causes items of debugging information resulting from the execution of the debugging instruction to be stored locally in the memory device without directly transmitting the debugging information to an external entity, said items of debugging information to be transmitted later to the external entity at the request of the external entity, and
   a third value corresponding to a second activation state in which the at least one debugging instruction causes said items of debugging information to be directly transmitted over a communication channel initiated by the hardware security module to the external entity.

2. The hardware security module according to claim 1, wherein the inhibition or activation state of said inhibition or activation means is changeable in response to a command received from the external entity.

3. The hardware security module according to claim 1, wherein the debugging instruction comprises a conditional instruction that is conditional as a function of said state flag.

4. The hardware security module according to claim 3, wherein the memory storing the state flag is a one-time programmable memory, such that inhibition of the debugging instruction is definitive.

5. The hardware security module according to claim 1, wherein the hardware security module is protected from modification by a cryptographic security mechanism.

6. The hardware security module according to claim 1,
   wherein the at least one debugging instruction is configured to copy items of debugging information to a file stored in the memory device of the hardware security module, and
   wherein the hardware security module is configured to transmit said file to the external entity at the request of said external entity.

7. The hardware security module according to claim 6, wherein said file is a fixed-length circular list.

8. A mobile phone comprising a contactless communication interface and a hardware security module according to claim 1, the hardware security module comprising a first electrical contact linked to said contactless communication interface,
   wherein a communication channel dedicated to driving the execution of the compiled program by an external master entity and the communication channel initiated by the hardware security module with said external entity are, for one of them, compliant with a contactless communication standard via the first electrical contact and, for the other one, compliant with a contact communication standard via a second electrical contact of the hardware security module.

9. A debugging method carried out by a hardware security module having a microprocessor and a compiled program stored in a memory device of the hardware security module and executable by said microprocessor to carry out an operation, the compiled program including at least one debugging instruction which does not change a result or functionality of said operation regardless of whether said at least one debugging instruction is executed, the method comprising:

at least one step of reading a state flag in the memory device and comparing a value of said state flag against each of first, second, and third values;

where the state flag is equal to the first value, operating in an inhibiting state wherein the debugging instruction is inhibited, such that the debugging instruction is not executed when the compiled program is executed, where the state flag is equal to the second value, operating in a first activation state in which the debugging instruction is executed when the compiled program is executed, and items of debugging information resulting from the execution of said debugging instruction are caused to be stored locally without directly transmitting the items of debugging information to an external entity, and where the state flag is equal to the third value, operating in a second activation state in which the debugging instruction is executed when the compiled program is executed, and the items of debugging information resulting from the execution of said at least one debugging instruction are caused to be directly transmitted over a communication channel, initiated by the hardware security module, to the external entity.

10. The debugging method according to claim 9, further comprising:

a step of receipt, by the hardware security module, of a command changing the inhibition or activation state, transmitted by the external entity.

11. The debugging method according to claim 9, further comprising:

a step of definitively switching to the inhibition state, by writing an item of inhibition information to a one-time programmable memory.

12. The debugging method according to claim 9, further comprising:

a prior authentication step for authorizing the switching from one state to the other.

13. The debugging method according to claim 9, wherein the debugging instruction comprises a conditional instruction that is conditional as a function of said state flag.

14. The debugging method according to claim 13, wherein the memory storing the state flag is a one-time programmable memory, such that inhibition of the debugging instruction is definitive.

15. The debugging method according to claim 9, wherein the inhibition or activation means is protected from modification by a cryptographic security mechanism.

16. The debugging method according to claim 9,
wherein the at least one debugging instruction is configured to copy items of debugging information to a file stored in a memory device of the hardware security module, and
wherein the hardware security module is configured to transmit said file to the external entity at the request of said external entity.

17. The debugging method according to claim 16, wherein said file is a fixed-length circular list.

* * * * *